(12) United States Patent
Cheng et al.

(10) Patent No.: US 12,265,270 B2
(45) Date of Patent: Apr. 1, 2025

(54) FLAME RETARDANT COMPOSITIONS FOR BUFFER TUBES AND METHOD OF MAKING SAME

(71) Applicant: CORNING RESEARCH & DEVELOPMENT CORPORATION, Corning, NY (US)

(72) Inventors: Xiaole Cheng, Painted Post, NY (US); Dayue Jiang, Painted Post, NY (US); Kevin Andrew Vasilakos, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 310 days.

(21) Appl. No.: 17/676,317

(22) Filed: Feb. 21, 2022

(65) Prior Publication Data

US 2022/0283393 A1  Sep. 8, 2022

Related U.S. Application Data

(60) Provisional application No. 63/157,985, filed on Mar. 8, 2021, provisional application No. 63/225,060, filed on Jul. 23, 2021.

(51) Int. Cl.
*G02B 6/44* (2006.01)
*C08L 67/02* (2006.01)
*C09K 21/12* (2006.01)

(52) U.S. Cl.
CPC ............ *G02B 6/4436* (2013.01); *C08L 67/02* (2013.01); *C09K 21/12* (2013.01); *C08L 2201/02* (2013.01)

(58) Field of Classification Search
CPC ....... G02B 6/443; G02B 6/4436; C08L 67/02; C09K 21/12
See application file for complete search history.

(56) References Cited

U.S. PATENT DOCUMENTS 6,610,770 B1 * 8/2003 Ross ..................... C08K 9/04
524/445
7,420,007 B2 * 9/2008 Bauer ................ C08K 5/34928
524/133

(Continued)

FOREIGN PATENT DOCUMENTS

CN 104177791 A 12/2014
CN 105566866 A * 5/2016

(Continued)

OTHER PUBLICATIONS

Machine translation of CN 105566866 A. (Year: 2016).*

(Continued)

*Primary Examiner* — Daniel Petkovsek
*Assistant Examiner* — Emma R. Oxford
(74) *Attorney, Agent, or Firm* — Thomas R. Irwin

(57) ABSTRACT

Embodiments of the disclosure relate to a flame retardant composition. The flame retardant composition includes 70 wt % to 90 wt % of at least one polybutylene terephthalate (PBT) resin, 15 wt % to 25 wt % of a flame retardant additive, an ethylene vinyl alcohol (EVOH), an organoclay synergist, and at least one of a PBT chain extender having epoxide functional groups or a reactive compound including at least two functional groups selected from the group consisting of an epoxide, a maleic anhydride, an isocyanate, an acrylate, and an acetate. The flame retardant composition is particularly suitable for buffer tubes of optical fiber cables.

12 Claims, 3 Drawing Sheets

(56) References Cited

U.S. PATENT DOCUMENTS

| | | | |
|---|---|---|---|
| 2011/0071240 A1* | 3/2011 | Ding | C08L 67/02 |
| | | | 524/133 |
| 2012/0225291 A1* | 9/2012 | Karayianni | C09D 167/025 |
| | | | 428/375 |
| 2016/0289445 A1 | 10/2016 | Tojo et al. | |
| 2016/0306129 A1* | 10/2016 | Hurley | G02B 6/4434 |
| 2017/0051136 A1* | 2/2017 | Kohri | C09K 21/02 |
| 2018/0059345 A1* | 3/2018 | Gallo | G02B 6/443 |
| 2019/0049681 A1* | 2/2019 | Bookbinder | G02B 6/0365 |
| 2019/0055398 A1 | 2/2019 | Tojo et al. | |
| 2019/0293887 A1* | 9/2019 | Bookbinder | G02B 6/4494 |
| 2020/0131044 A1* | 4/2020 | Nishimura | C09C 1/3054 |
| 2020/0408987 A1 | 12/2020 | Morinaka et al. | |
| 2021/0032402 A1 | 2/2021 | Okunaga et al. | |
| 2022/0340739 A1* | 10/2022 | Seven | C08L 23/0869 |

FOREIGN PATENT DOCUMENTS

| | | | | |
|---|---|---|---|---|
| CN | 107329223 A | * | 11/2017 | G02B 6/443 |
| WO | WO-9943747 A1 | * | 9/1999 | C08K 5/523 |

OTHER PUBLICATIONS

Machine translation of CN 107329223 A. (Year: 2017).*
European Patent Application No. 22160062.0, Extended European Search Report, dated Jul. 28, 2022; 7 pages; European Patent Office.
Gallo et al., "Halogen-free Flame Retarded Poly(butylene terephthalate) (PBT) Using Metal Oxides/PBT Nanocomposites in Combination with Aluminium Phosphinate", Polymer Degradation and Stability, vol. 94, No. 8, 2009, pp. 1245-1253.

* cited by examiner

FLAME RETARDANT COMPOSITIONS FOR BUFFER TUBES AND METHOD OF MAKING SAME

CROSS-REFERENCE TO RELATED APPLICATION

This application claims the benefit of priority under 35 U.S.C. § 119 of U.S. Provisional Application Ser. No. 63/157,985, filed on Mar. 8, 2021 and U.S. Provisional Application Ser. No. 63/225,060, filed on Jul. 23, 2021, the content of each of which is relied upon and incorporated herein by reference in its entirety.

BACKGROUND

The disclosure relates generally to a fiber optic cable and more particularly to a flame retardant composition particularly suitable for buffer tubes of optical fiber cables. Certain current standards require a degree of flame retardancy for construction products, especially for indoor applications. Some of these standards extend to electrical and telecommunication cables. Often, to achieve the requisite degree of flame retardance for these cables, desired mechanical properties may have to be compromised for the cable construction. Besides reliability over its life, the compromised mechanical properties can also make installation of the optical fiber cable more difficult.

SUMMARY

In one aspect, embodiments of the present disclosure relate to a flame retardant composition. The flame retardant composition includes 70 wt % to 90 wt % of at least one polybutylene terephthalate (PBT) resin, 15 wt % to 25 wt % of a flame retardant additive, an ethylene vinyl alcohol (EVOH), an organoclay synergist, and at least one of a PBT chain extender having epoxide functional groups or a reactive compound including at least two functional groups selected from the group consisting of an epoxide, a maleic anhydride, an isocyanate, an acrylate, and an acetate.

In another aspect, embodiments of the present disclosure relate to an optical fiber cable. The optical fiber cable includes at least one buffer tube. Each of the at least one buffer tube has a first exterior surface and a first interior surface that defines a central bore along a longitudinal axis of the optical fiber cable. The optical fiber cable also includes at least one optical fiber disposed within the central bore of each of the at least one buffer tube. Further, the optical fiber cable includes a cable jacket disposed around the at least one buffer tube. The cable jacket has a second interior surface and a second exterior surface defining an outermost surface of the optical fiber cable. Each of the at least one buffer tube is made of a flame retardant composition. The flame retardant composition includes at least one polybutylene terephthalate (PBT) resin, a dialkylphosphinic salt, an ethylene vinyl alcohol (EVOH), an organoclay synergist, and at least one of a PBT chain extender or a reactive compound including at least two functional groups selected from the group of an epoxide, a maleic anhydride, an isocyanate, an acrylate, and an acetate. The dialkylphosphinic salt and the organoclay synergist comprise at least 16 wt % of the flame retardant composition.

In still another aspect, embodiments of the present disclosure relate to a method. In the method, a flame retardant composition is compounded. The flame retardant composition includes (i) at least one polybutylene terephthalate (PBT) resin, (ii) a dialkylphosphinic salt, (iii) at least one of a PBT chain extender or a reactive compound comprising at least two functional groups selected from the group consisting of an epoxide, a maleic anhydride, an isocyanate, an acrylate, and an acetate, (iv) an ethylene vinyl alcohol (EVOH), and (v) an organoclay synergist. Further, in the method, the flame retardant composition is extruded as a buffer tube around at least one optical fiber.

Additional features and advantages will be set forth in the detailed description that follows, and in part will be readily apparent to those skilled in the art from the description or recognized by practicing the embodiments as described in the written description and claims hereof, as well as the appended drawing.

It is to be understood that both the foregoing general description and the following detailed description are merely exemplary, and are intended to provide an overview or framework to understand the nature and character of the claims.

BRIEF DESCRIPTION OF THE DRAWING

The accompanying drawing is included to provide a further understanding and are incorporated in and constitute a part of this specification. The drawing illustrates one or more embodiment(s), and together with the description serves to explain principles and the operation of the various embodiments.

DETAILED DESCRIPTION

Various embodiments of a flame retardant composition, particularly suitable for use as a buffer tube in an optical fiber cable, are disclosed herein. The flame retardant composition for buffer tubes is based on a polybutylene terephthalate (PBT) resin to which a reactive compound and/or a PBT chain extender, an ethylene vinyl alcohol (EVOH), a flame retardant additive, and a synergist are added. The flame retardant PBT composition exhibits significantly decreased peak heat release rate and total heat release as compared to conventional PBT compositions for buffer tubes, including even certain conventional flame retardant PBT compositions. Notwithstanding, the PBT compositions as disclosed herein maintain similar mechanical properties to pure PBT and significantly enhance certain mechanical properties (such as elongation at break) as compared to currently available flame retardant PBT compositions. Further, when the flame retardant PBT compositions are incorporated as buffer tubes of optical fiber cables having other flame retardant components, such as low smoke, zero halogen cable jackets, it is believed that such cables will achieve a B2 rating according to the European Construction Products Regulation, which is the highest rating for cables according to that standard. These and other aspects and advantages will be discussed in relation to the exemplary embodiments disclosed herein. These embodiments of the flame retardant PBT compositions and buffer tubes made therefrom discussed herein are provided by way of example and not by way of limitation.

Figure 1:
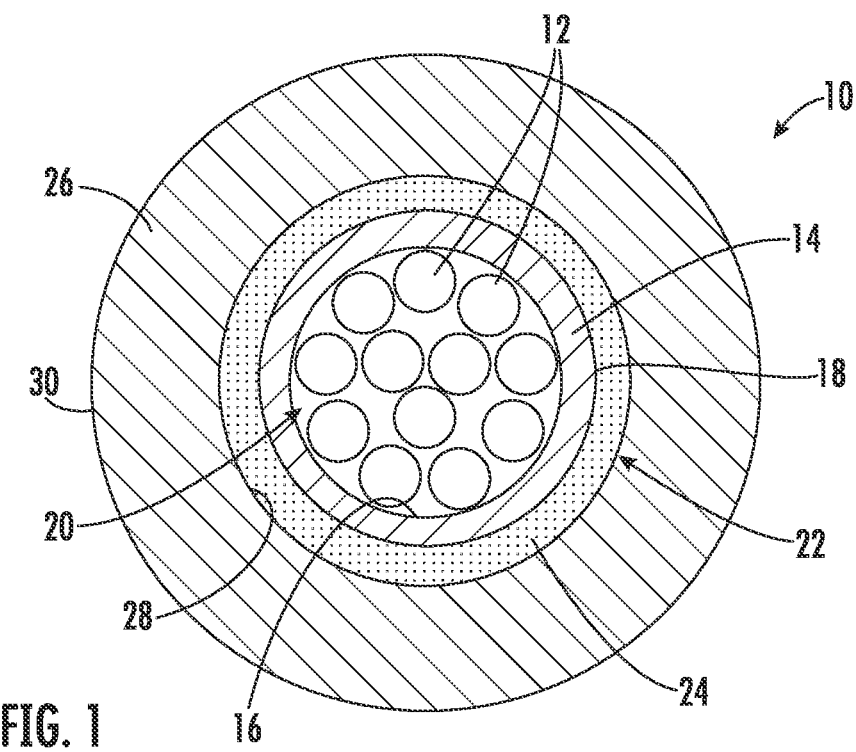
FIG. 1 depicts an embodiment of an optical fiber cable having a flame retardant buffer tube, according to an exemplary embodiment.

FIG. 1 depicts an embodiment of an optical fiber cable 10 that includes a plurality of optical fibers 12 disposed within a buffer tube 14. The buffer tube 14 includes a first interior surface 16 and a first exterior surface 18. The first interior surface 16 defines a first central bore 20 in which the optical fibers 12 are disposed. In the embodiment shown in the FIG. 1, the optical fibers 12 are arranged within the bore 20 in a loose tube configuration. In embodiments, the optical fibers 12 are bare fibers, i.e., they include a core, a cladding surrounding the core, and a coating (optionally including a color-coded ink/pigment layer for identification), and in other embodiments, the optical fibers 12 are tight-buffered, including a polymeric jacket outside of the coating layer. Further, in embodiments, the optical fibers 12 may be arranged in one or more ribbons within the buffer tube 14. In embodiments, the number of optical fibers 12 in the buffer tube is, for example, from one to 144 optical fibers.

In the embodiment depicted in FIG. 1, a yarn layer 22 comprising a plurality of strengthening yarns 24 is disposed around the buffer tube 14. In embodiments, the strengthening yarns 24 are wrapped, stranded, or braided around the subunit 14 so as to take tensile stresses off of the optical fibers 12, e.g., when the optical fiber cable 10 is pulled. In other embodiments, the strengthening yarns 24 run longitudinally along the length of the subunit 14. The yarn layer 22 is in contact with the first exterior surface 18 of the subunit 14. In embodiments, the strengthening yarns 24 comprise aramid fibers, glass fibers, basalt fibers, or a combination of two or more thereof.

In the embodiment depicted in FIG. 1, a cable jacket 26 is disposed around the yarn layer 22. In embodiments, the cable jacket 26 forms a continuous and contiguous outer layer of the optical fiber cable 10 along the length of the optical fiber cable 10. The cable jacket 26 includes a second interior surface 28 and a second exterior surface 30. Further, in embodiments, the second exterior surface 30 defines the outermost surface of the optical fiber cable 10.

Figure 2:
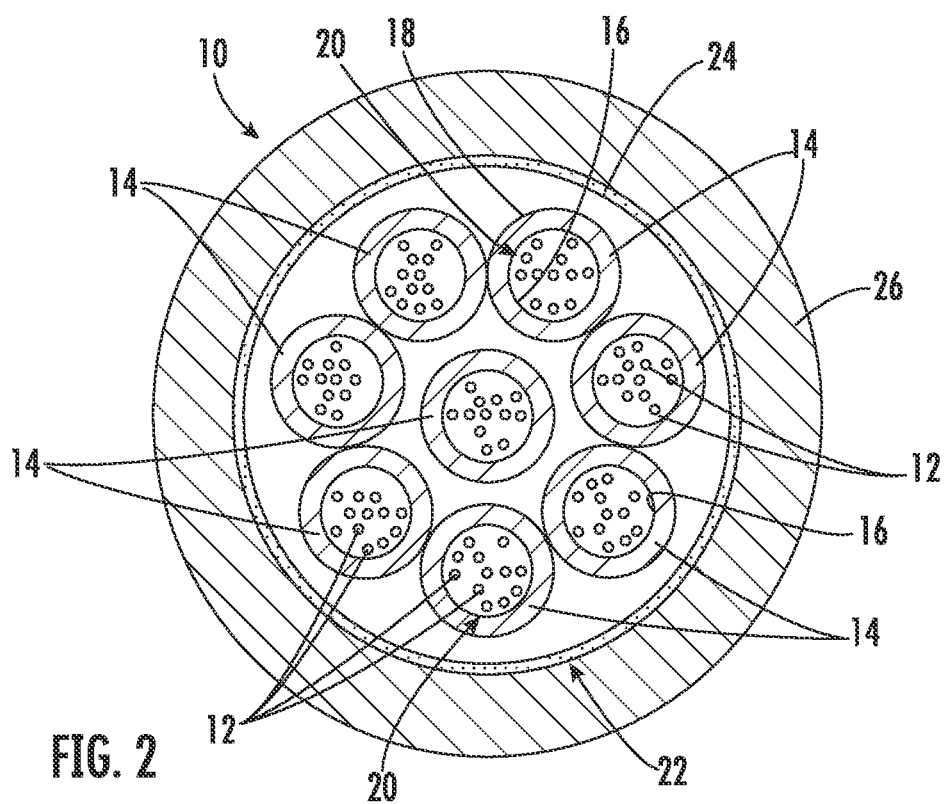
FIG. 2 depicts an embodiment of an optical fiber cable having a plurality of flame retardant buffer tubes, according to an exemplary embodiment.

FIG. 2 depicts an embodiment of an optical fiber cable 10 including multiple buffer tubes 14. In embodiments, each of the buffer tubes 14 of FIG. 2 may contain, for example, from one to 144 optical fibers 12. In embodiments, the buffer tubes 14 contain and/or are surrounded by the layer 22 of strengthening yarns 24. In particular, a plurality of strengthening yarns 24 may be wrapped around the first exterior surfaces 18 of the buffer tubes 14 to keep them bundled in the cable jacket 26. Further, in embodiments, the buffer tubes 14 include strengthening yarns 24 within the central bore 20 to facilitate connectorizing the buffer tubes 14. During connectorizing, the strengthening yarns 24 are crimped into the connector to provide tensile strain relief for the optical fibers 12. The strengthening yarns 24 used on the interior and/or exterior of the subunit 14 may comprise aramid fibers, glass fibers, basalt fibers, or combinations of two or more thereof.

Embodiments of optical fiber cables 10 according to the present disclosure, such as those depicted in FIGS. 1 and 2, are configured to achieve a rating of B2 as described in EN 13501-6. In order to achieve rating B2, the optical fiber cable 10 must pass the heat release and flame spread requirements of EN50399. In that regard, embodiments of the optical fiber cable 10 according to the present disclosure include a cable jacket 26 that is made of a low-smoke, zero halogen (LSZH) material. Further, as will be discussed more fully below, the buffer tube 14 is also made of a flame retardant composition, in particular a flame retardant polybutylene terephthalate (FR-PBT) composition. The combination of a LSZH cable jacket 26 and buffer tube(s) 14 made of the FR-PBT composition creates an overall fire retardant optical fiber cable 10.

In general, the FR-PBT composition includes one or more PBT resins, a PBT chain extender and/or a reactive compound, an ethylene vinyl alcohol (EVOH), a flame retardant additive, and a synergist. Each of these components is described in greater detail below.

Regarding the PBT component, the FR-PBT composition includes from 70 wt % to 90 wt %, particularly 75 wt % to 85 wt %, and more particularly about 80 wt %, of at least one PBT resin. In certain embodiments, the least one PBT resin includes a first PBT resin and a second PBT resin. In embodiments, the first PBT resin is an extrusion grade PBT having a volume flow index in the range of 5 $cm^3$/10 min to 15 $cm^3$/10 min (measured at 250° C. under a load of 5 kg per ISO 1133). In such embodiments, the second PBT resin is a PBT with volume flow index lower than the first PBT resin. In embodiments, the second PBT resin is added to improve processability, in particular maintaining desired dimensions of an extruded buffer tube. In such embodiments, the second PBT resin comprises from 5 wt % to 50 wt % of the total PBT resin. In an exemplary embodiment, the first PBT resin is Ultradur® B6550 LN (available from BASF SE, Ludwigshafen, Germany). In an exemplary embodiment, the second PBT resin is Ultradur® B6651 LNI (available from BASF SE, Ludwigshafen, Germany).

In embodiments, the FR-PBT composition includes a PBT chain extender. In particular embodiments, the PBT chain extender has high epoxide functionality. In embodiments, the epoxide functionality as defined in epoxide equivalent weight is from 300 g/mol to 500 g/mol. Commercially available PBT chain extenders suitable for use in the FR-PBT composition include Joncryl® ADR 4400 (epoxide equivalent weight of 485 g/moL) and Joncryl® ADR 4468 (epoxide equivalent weight of 310 g/mol), both available from BASF SE, Ludwigshafen, Germany. In embodiments, the FR-PBT includes up to 5 wt % of the PBT chain extender (i.e., greater than 0 wt % and up to 5 wt %), in particular 0.1 wt % to 5 wt % of the PBT chain extender, and more particularly from 1 wt % to 3 wt %. In embodiments of the FR-PBT composition containing the PBT chain extender, the PBT chain extender reduces the volume flow index and improves melt strength and extrusion stability.

As mentioned above, the FR-PBT composition includes a reactive compound in addition to or in place of the PBT chain extender. In embodiments, the reactive compound comprises at least two functional groups or is a copolymer having one or more monomers comprising at least two functional groups. The functional groups are selected from the group consisting of an epoxide, a maleic anhydride, an isocyanate, an acrylate, or an acetate. For example, the reactive polymer may be a copolymer in which each monomer includes at least one functional group (e.g., an epoxide), or a copolymer in which one monomer contains at least two functional groups (e.g., a di- or tri-isocyanate). In embodiments, the FR-PBT composition includes up to 3 wt % of the reactive compound (i.e., greater than 0 wt % and up to 3 wt %). In certain embodiments, the FR-PBT composition includes from 0.5 wt % to 2 wt %, in particular 0.5 wt % to 1.5 wt %, and more particularly about 1 wt %, of the reactive compound.

In embodiments, the reactive compound is a terpolymer that includes one monomer of ethylene and a second monomer of an acrylate or an acetate. Further, in embodiments, the third monomer of the terpolymer is maleic anhydride or glycidyl methacrylate. Further, in embodiments, the terpolymer is a random terpolymer of the three monomers. Commercially available terpolymers that may be used in the FR-PBT include Lotader® 3410, ax8840, ax8750, and ax8900 (available from SK Functional Polymer SAS, France). In another embodiment, the reactive compound is a polyurethane. In another embodiment, the reactive compound is a chemical including a di- or tri-epoxide, a di- or tri-maleic anhydride, or a di- or tri-isocyanate.

The FR-PBT composition further includes EVOH. The FR-PBT composition includes up to 3 wt % of the EVOH (i.e., greater than 0 wt % and up to 3 wt %). In certain embodiments, the FR-PBT composition includes from 0.5 wt % to 2 wt %, in particular 0.5 wt % to 1.5 wt %, and more particularly about 1 wt %, of EVOH. In embodiments, the EVOH comprises an ethylene content of 28 mol % to 48 mol %, in particular 30 mol % to 40 mol %, and more particularly about 32 mol %.

In embodiments, the FR-PBT composition further includes a flame retardant additive. In embodiments, the flame retardant additive comprises one or more dialkylphosphinic salts. For example, in embodiments, the flame retardant additive comprises at least one of aluminum diethyl phosphinate, aluminum methylethyl phosphinate, titanyl diethyl phosphinate, titanium diethyl phosphinate, titanyl methylethyl phosphinate, titanium methylethyl phosphinate, zinc diethyl phosphinate, and zinc methylethyl phosphinate. In a particular embodiment, the flame retardant additive is aluminum diethyl phosphinate (e.g., Exolit® OP 1230 available from Clariant International Ltd, Pratteln, Switzerland). The FR-PBT composition includes 15 wt % to 25 wt % of the flame retardant additive. In certain embodiments, the FR-PBT composition includes from 15 wt % to 20 wt %, in particular 15 wt % to 17 wt %, of the flame retardant additive.

In embodiments, the FR-PBT composition further includes a synergist. In embodiments, the synergist comprises an organoclay. In embodiments, the organoclay is modified with an organic amine salt. In an embodiment, the organoclay is modified with bis(hydrogenated tallow alkyl) dimethyl ammonium salt (2M2HT) (e.g., Cloisite-15A or Cloisite 20A, available from BYK-Chemie GmbH, Wesel, Germany). In other embodiments, the organoclay is modified with methyl, tallow, bis-2-hydroxyethyl quaternary ammonium (MT2EtOT) or (hydrogenated tallow alkyl)(2-ethylhexyl)dimethyl ammonium salt (2MHTL8). The FR-PBT composition includes up to 3 wt % of the synergist (i.e., greater than 0 wt % and up to 3 wt %). In certain embodiments, the FR-PBT composition includes from 0.5 wt % to 2 wt %, in particular 0.5 wt % to 1.5 wt %, and more particularly about 1 wt %, of the synergist.

In embodiments, the FR-PBT composition further includes other additives for general purposes. In embodiments, the additives include but not limit to antioxidants, slip additives, colorants, UV and/or heat stabilizers, antistatic agents, pigments, lubricants, etc. The total amount of additives is less than 3%, preferably less than 2%, more preferably less than 1% of total composition.

In embodiments, the total amount of flame retardant additive and synergist is at least 16 wt % of the FR-PBT. In further embodiments, the total amount of flame retardant additive and synergist is at least 18 wt % of the FR-PBT, and in still further embodiments, the total amount of flame retardant additive and synergist is at least 20 wt % of the FR-PBT.

The reactive compound and the EVOH act as cross-linkers, compatibilizers, and/or chain extenders, which provides better interaction between the polymers and the flame retardant additive and synergist. Further, the reactive compound can be used to increase the toughness of the FR-PBT composition. Advantageously, during compounding, the polymers will dissociate, providing an opportunity for interaction between the PBT resin component and the EVOH and the reactive compound and/or the PBT chain extender. In particular, dissociation of the PBT results in carboxylic acids and alcohols, which are able to react with the EVOH and the functional groups of the reactive compound, such as maleic anhydride, or the epoxide group of the PBT chain extender. In embodiments, the FR-PBT composition is prepared by melt compounding during an extrusion process.

Samples of the presently disclosed FR-PBT composition were evaluated for their flame retardancy and mechanical properties. Table 1, below, provides the compositions of two comparative examples and an exemplary composition according the present disclosure. As can be seen in Table 1, the first comparative example (CE1) was a control sample containing 100% PBT resin (Ultradur® B 6550 LN). The second comparative example (CE2) contained 85 wt % of PBT resin and 15 wt % of the flame retardant additive (aluminum diethyl phosphinate). Example 1 (E1) according to the present disclosure contained 80 wt % PBT; 1 wt % of a random terpolymer of ethylene, an acrylate, and maleic anhydride (Lotader® 3410); 1 wt % EVOH, 1 wt % of the synergist (Cloisite-15A/20A), and 17 wt % of the flame retardant additive (aluminum diethyl phosphinate).

TABLE 1

Compositions of Tested Specimens

| Material | CE1 | CE2 | E1 |
|---|---|---|---|
| PBT | 100 | 85 | 80 |
| Reactive polymer | 0 | 0 | 1 |
| EVOH | 0 | 0 | 1 |
| Synergist | 0 | 0 | 1 |
| Flame Retardant Additive | 0 | 15 | 17 |

Test specimens were obtained from the compositions according to Table 1 by extruding the compositions via an 18 mm twin screw extruder.

According to the European Construction Products Regulation, cables are graded as B2, C, D, or E with B2 being the highest rating and E being the lowest rating. The ratings are based on combustion tests in which peak heat release rate (PHRR) and total heat release (THR) are measured, among other flame retardancy aspects, according to EN 50399. It should be noted that these tests are based on the cable as a whole. It is believed that a cable constructed with buffer tubes made of the disclosed FR-PBT and, e.g., an LSZH cable jacket will exhibit a B2 rating based on known flame retardant properties of LSZH cable jackets and based on the performance of the presently disclosed FR-PBT in cone calorimeter testing according to ASTM E1354 (using sample size 100 mm×100 mm×3 mm subjected to heat flux of 50 kW/m$^2$).

Figure 3A:
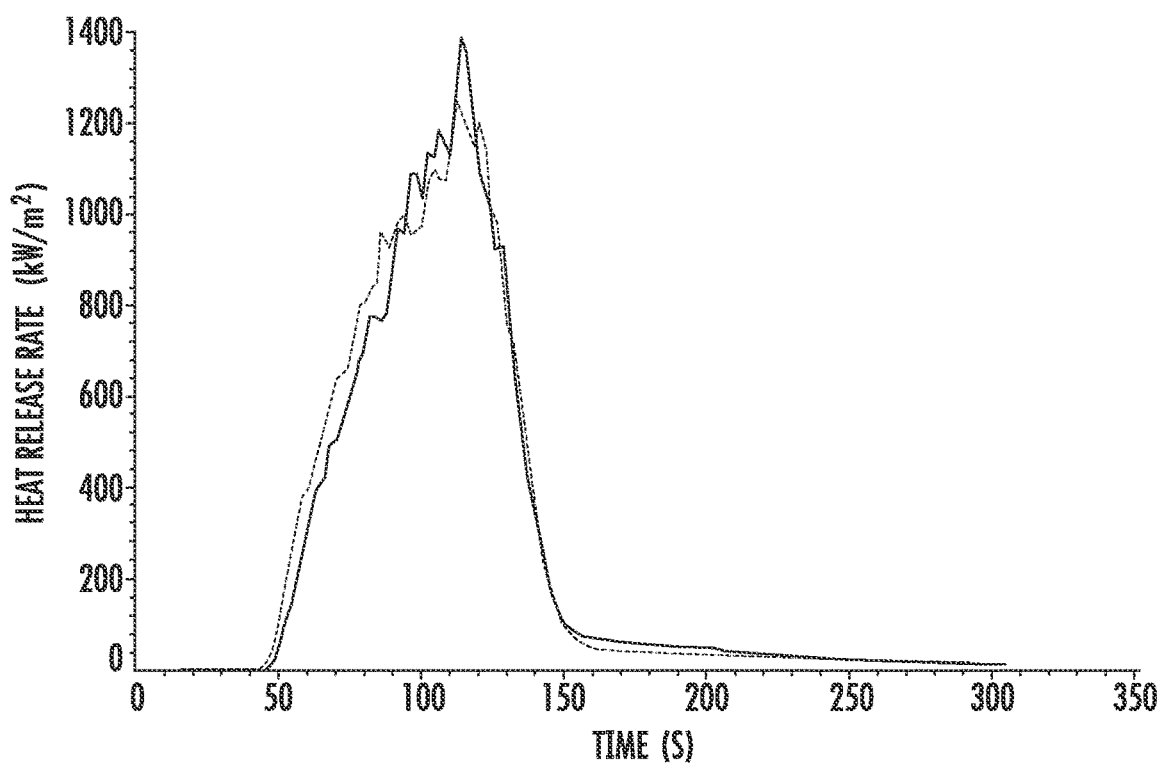
FIGS. 3A-3C are graphs of peak heat release rate for two comparative example compositions (FIGS. 3A and 3B) and one flame retardant composition according to an embodiment of the present disclosure (FIG. 3C).
Figure 3B:
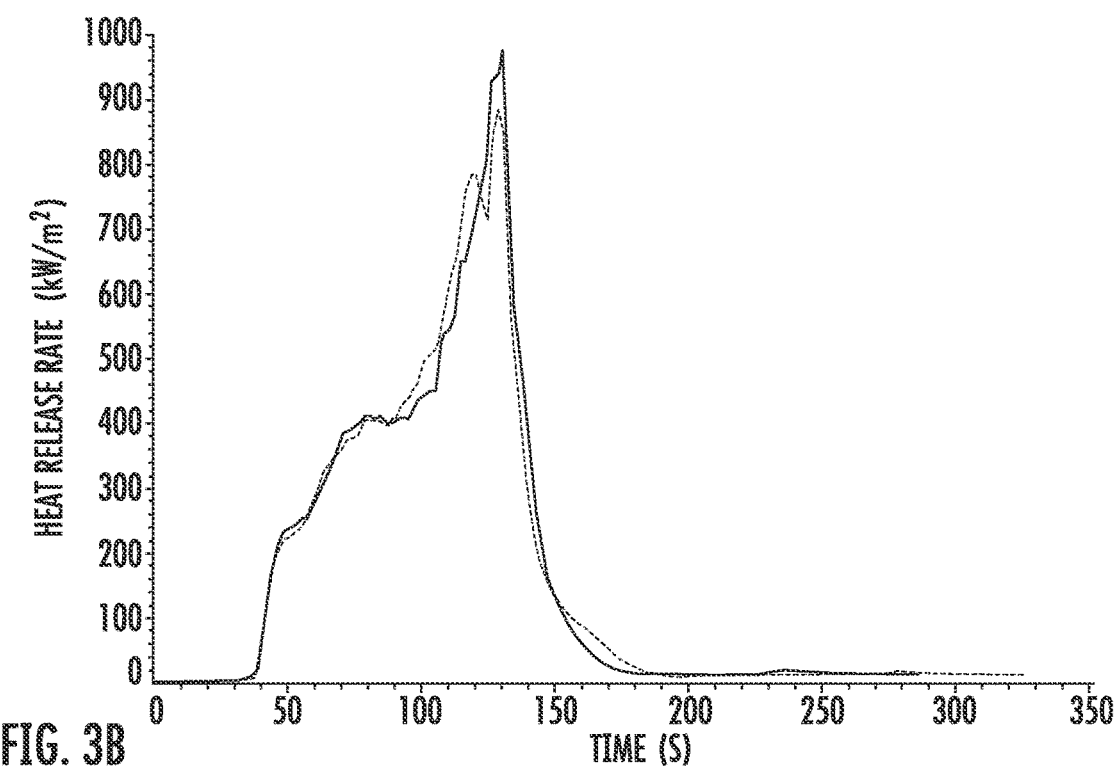
Figure 3C:
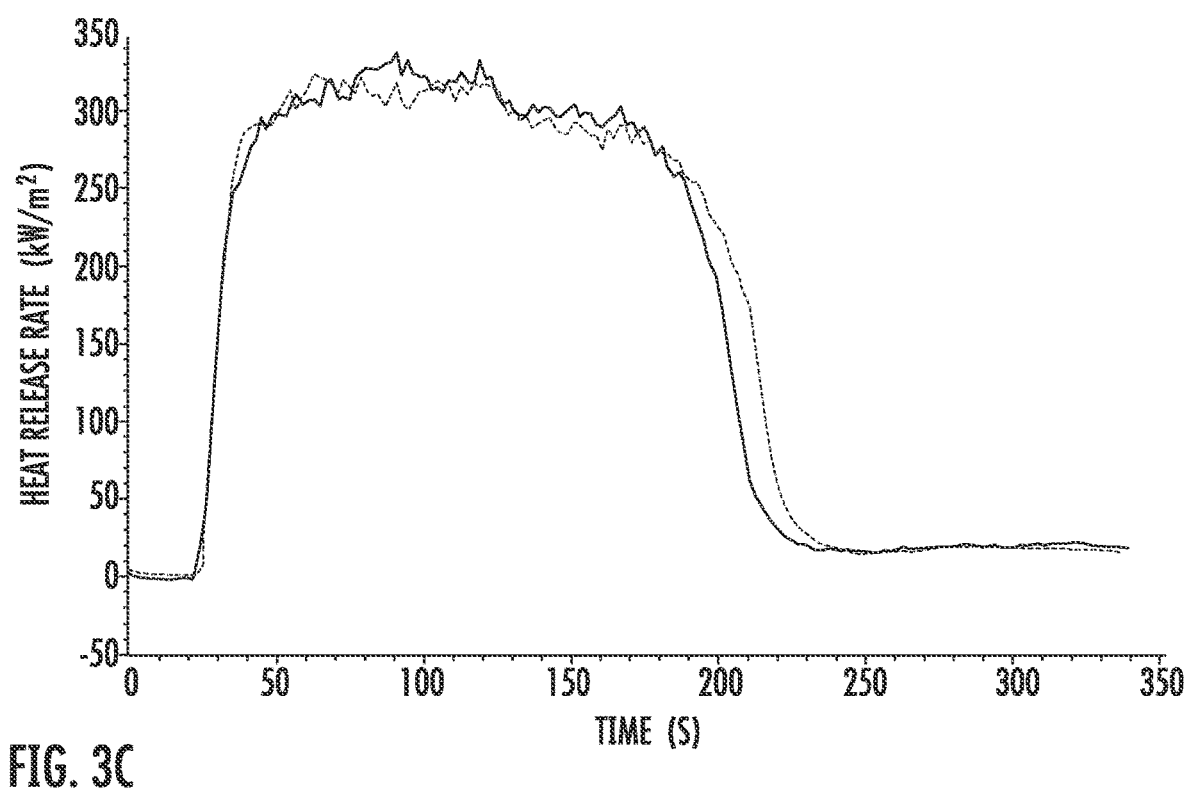

FIGS. 3A-3C depict graphs of heat release rates as a function of time for CE1, CE2, and E1, respectively. Referring first to FIG. 3A, CE1, which contained no flame retardant additive, exhibited a PHRR of about 1320 kW/m$^2$ (based on an average of the peaks for the two curves shown in FIG. 3A). The THR for CE1 was about 78 MJ/m$^2$. As shown in FIG. 3B, CE2, which contained 15 wt % of the flame retardant additive, exhibited a lower PHRR that was still over 900 kW/m² (based on an average of the peaks from the two curves shown in FIG. 3B). Additionally, CE2 exhibited sparking while burning, which can contribute to flame spread to other structures.

As shown in FIG. 3C, E1, which included the flame retardant additive, synergist, reactive compound, and EVOH, exhibited a significantly lower PHRR of less than 500 kW/m². In particular, the PHRR of E1 was about 330 kW/m² (based on an average of the peaks for the two curves shown in FIG. 3C), which is a reduction of about 75% as compared to CE1. Further, E1 exhibited a THR of less than 60 MJ/m², and specifically, the THR or E1 was about 55 MJ/m², which was a reduction of about 30% compared to CE1. E1 also did not exhibit any sparking during combustion, and the limiting oxygen index (LOI) was at least 40%, in particular about 43%. Because of the high LOI, fire on the cable extinguished in a few seconds after removing the source (e.g., propane torch).

Besides the flame retardancy, the FR-PBT also exhibited good mechanical properties. In particular, E1 exhibited an elongation at break of at least 200%. In particular, the elongation at break measured for E1 was about 360%, which is comparable to pure PBT (CE1), which exhibits an elongation at break of about 330%. CE2, containing 15 wt % of flame retardant additive, was brittle, exhibiting an elongation at break of less than 5%. Thus, E1 performed better than CE2 despite having a higher loading of flame retardant additive. Additionally, E1 exhibited a tensile strength of at least 30 MPa, specifically about 35 MPa, which is substantially similar to the results exhibited using pure PBT (CE1).

While the foregoing discussion focused primarily on buffer tubes of optical fiber cables, the flame retardant composition is not limited only to that particular application, and indeed, the flame retardant composition can be utilized in any application where the combination of mechanical properties and flame retardancy are applicable. Moreover, the discussion and examples have so far been limited to non-halogen containing compositions. However, the teachings can be applied to halogen containing compounds. Additionally, the foregoing discussion has specifically discussed polybutylene terephthalate because of its particular suitability for buffer tube applications, but the flame retardant composition is broadly applicable to polyester resins (e.g., polyethylene terephthalate) and also to polyamide (e.g., polyamide 6 and polyamide 6,6). Additionally, the flame retardant composition may also include glass-filled resins, such as glass-filled PBT resins.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   at least one buffer tube, each of the at least one buffer tube comprising a first exterior surface and a first interior surface that defines a central bore along a longitudinal axis of the optical fiber cable;
   at least one optical fiber disposed within the central bore of each of the at least one buffer tube;
   a cable jacket disposed around the at least one buffer tube, the cable jacket comprising a second interior surface and a second exterior surface defining an outermost surface of the optical fiber cable;
   wherein each of the at least one buffer tube comprises a flame retardant composition, comprising:
      at least one polybutylene terephthalate (PBT) resin;
      a dialkylphosphinic salt;
      an ethylene vinyl alcohol (EVOH);
      an organoclay synergist; and
      at least one of:
         a PBT chain extender; or
         a reactive compound comprising at least two functional groups selected from the group consisting of an epoxide, a maleic anhydride, an isocyanate, an acrylate, and an acetate;
      wherein the dialkylphosphinic salt and the organoclay synergist comprise at least 16 wt % of the flame retardant composition.

2. The optical fiber cable of claim 1, wherein the optical fiber cable achieves a B2 rating according to EN13501-6.

3. The optical fiber cable of claim 1, wherein the dialkylphosphinic salt comprises at least one of aluminum diethyl phosphinate, aluminum methylethyl phosphinate, titanyl diethyl phosphinate, titanium diethyl phosphinate, titanyl methylethyl phosphinate, titanium methylethyl phosphinate, zinc diethyl phosphinate, or zinc methylethyl phosphinate.

4. The optical fiber cable of claim 1, wherein the at least one PBT resin comprises a first PBT resin and a second PBT resin and wherein the first PBT resin comprises a first volume flow index of 5 cm³/10 min to 15 cm³/10 min and the second PBT resin comprises a second volume flow index that is less than the first volume flow index.

5. The optical fiber cable of claim 4, wherein the second PBT resin comprises from 5 wt % to 50 wt % of the at least one PBT resin.

6. The optical fiber cable of claim 1, comprising the PBT chain extender in an amount up to 5 wt % of the flame retardant composition, wherein the PBT chain extender comprises an epoxide equivalent weight of 300 g/mol to 500 g/mol.

7. The optical fiber cable of claim 1, comprising the reactive compound in an amount up to 3 wt % of the flame retardant composition, wherein the reactive compound comprises:
   a polyurethane; or
   a random terpolymer of (i) ethylene, (ii) an acrylate or an acetate, and (iii) a maleic anhydride or a glycidyl methacrylate.

8. The optical fiber cable of claim 1, comprising at least one of a peak heat release rate of 500 kW/m² or less or a total heat release of 60 MJ/m² or less as measured in a cone calorimeter according to ASTM E1354.

9. The optical fiber cable of claim 1, wherein the flame retardant composition comprises 70 wt % to 90 wt % of the at least one polybutylene terephthalate (PBT) resin and 15 wt % to 25 wt % of the dialkylphosphinic salt.

10. The optical fiber cable of claim 1, wherein the flame retardant composition comprises up to 3 wt % of the EVOH.

11. The optical fiber cable of claim 1, wherein the flame retardant composition comprises up to 3 wt % of the organoclay synergist.

12. The optical fiber cable of claim 1, wherein the organoclay synergist is modified with at least one of bis(hydrogenated tallow alkyl)dimethyl ammonium salt; methyl tallow bis(2-hydroxylethyl) quaternary ammonium salt; or (hydrogenated tallow alkyl)(2-ethylhexyl)dimethyl ammonium salt.

* * * * *